US012750871B2

(12) United States Patent
Tsai et al.

(10) Patent No.: US 12,750,871 B2
(45) Date of Patent: Sep. 29, 2026

(54) USER EQUIPMENT AND METHOD FOR ALLOCATING SIDELINK RESOURCES

(71) Applicant: MEDIATEK INC., Hsinchu City (TW)

(72) Inventors: Lung-Sheng Tsai, Hsinchu City (TW); Tao Chen, Beijing (CN)

(73) Assignee: MEDIATEK INC., Hsinchu City (TW)

( * ) Notice: Subject to any disclaimer, the term of this patent is extended or adjusted under 35 U.S.C. 154(b) by 494 days.

(21) Appl. No.: 18/247,522

(22) PCT Filed: Sep. 24, 2021

(86) PCT No.: PCT/CN2021/120118
§ 371 (c)(1),
(2) Date: Mar. 31, 2023

(87) PCT Pub. No.: WO2022/073423
PCT Pub. Date: Apr. 14, 2022

(65) Prior Publication Data

US 2023/0379947 A1 Nov. 23, 2023

(30) Foreign Application Priority Data

Oct. 9, 2020 (WO) ................ PCT/CN2020/120000

(51) Int. Cl.
*H04W 72/40* (2023.01)
*H04W 72/0446* (2023.01)
(Continued)

(52) U.S. Cl.
CPC ....... *H04W 72/40* (2023.01); *H04W 72/0446* (2013.01); *H04W 72/25* (2023.01); *H04W 72/566* (2023.01); *H04W 92/18* (2013.01)

(58) Field of Classification Search
CPC .. H04W 72/40; H04W 72/0446; H04W 72/25
See application file for complete search history.

(56) References Cited

U.S. PATENT DOCUMENTS 11,129,138 B2 9/2021 Li et al.
11,601,789 B2 3/2023 Panteleev
(Continued)

FOREIGN PATENT DOCUMENTS

CN 106792885 A 5/2017
CN 108024273 A 5/2018
(Continued)

OTHER PUBLICATIONS

Extended European Search Report dated Aug. 29, 2024, issued in application No. EP 21876960.2.
(Continued)

*Primary Examiner* — Raj Jain
(74) *Attorney, Agent, or Firm* — McClure, Qualey & Rodack, LLP

(57) ABSTRACT

A method for allocating sidelink resource is provided. The method is applied to a first UE in a sidelink communication to transmit signal to a second UE which is a peer receiving (peer-Rx) UE of the first UE. The method includes the steps of maintaining, a counter to record how many remaining periodic reservations of sidelink resource to be used for sidelink signal transmission, wherein the periodic reservations are associated with a reservation period; receiving, in the sidelink communication, assistance information from the second UE or from a third UE which is not the peer-Rx UE of the first UE; and determining, whether to reselect a new sidelink resource different from the sidelink resource comprising the remaining periodic reservations according to the receiving assistance information even if the counter is greater than 0, to transmit signal to the second UE.

10 Claims, 6 Drawing Sheets

(51) Int. Cl.
*H04W 72/25* (2023.01)
*H04W 72/566* (2023.01)
*H04W 92/18* (2009.01)

(56) References Cited

U.S. PATENT DOCUMENTS

| | | | | |
|---|---|---|---|---|
| 2019/0007974 | A1 | 1/2019 | Nguyen | |
| 2019/0306835 | A1 | 10/2019 | Hoang et al. | |
| 2019/0313375 | A1* | 10/2019 | Loehr | H04W 72/04 |
| 2020/0008183 | A1 | 1/2020 | Chen | |
| 2020/0029340 | A1 | 1/2020 | He et al. | |
| 2020/0196353 | A1 | 6/2020 | Zhang et al. | |
| 2020/0260472 | A1 | 8/2020 | Ganesan | |
| 2022/0015186 | A1* | 1/2022 | Jeong | H04L 1/1896 |
| 2022/0104126 | A1* | 3/2022 | Lee | H04W 52/0219 |
| 2023/0171738 | A1* | 6/2023 | Di Girolamo | H04W 72/02 370/329 |
| 2023/0262660 | A1 | 8/2023 | Park | |
| 2023/0379947 | A1* | 11/2023 | Tsai | H04W 72/0446 |
| 2024/0276521 | A1 | 8/2024 | Ding | |

FOREIGN PATENT DOCUMENTS

| | | | |
|---|---|---|---|
| CN | 109792370 | A | 5/2019 |
| CN | 110062465 | A | 7/2019 |
| CN | 111182639 | A | 5/2020 |
| CN | 111225446 | A | 6/2020 |
| CN | 111726147 | A | 9/2020 |
| CN | 111727651 | A | 9/2020 |
| WO | 2018/031086 | A1 | 2/2018 |
| WO | 2020/017939 | A1 | 1/2020 |
| WO | 2020/092939 | A1 | 5/2020 |
| WO | 2020/169024 | A1 | 8/2020 |

OTHER PUBLICATIONS

Lenovo, et al.; "Remaining issues on physical layer structure for NR sidelink;" 3GPP TSG RAN WG1 #101-e; May-Jun. 2020; pp. 1-4.

Lenovo, et al.; "Sidelink Physical layer structures in NR V2X;" 3GPP TSG RAN WG1 #99; Nov. 2019; pp. 1-10.

Intel Corporation; "Sidelink Resource Allocation Mode-2 Design for NR V2X Communication;" 3GPP TSG TAN WG1 Meeting #97; May 2019; pp. 1-18.

3GPP; "Overall description of Radio Access Network (RAN) aspects for Vehicle-to-everything (V2X) based on LTE and NR (Release 16);" Jun. 2020; pp. 1-35.

Extended European Search Report dated Oct. 9, 2024, issued in application No. EP 21876941.2.

International Search Report and Written Opinion dated Nov. 26, 2021, issued in application No. PCT/CN2021/120118.

APPLE; "Remaining Issues of Resource Allocation for Mode 2;" 3GPP TSG RAN WG1 #101 R1-2004217; Jun. 2020; pp. 1-6.

Vivo; "Discussion on mode 2 resource allocation mechanism;" 3GPP TSG RAN WG1 #97 R1-1906139; May 2019; pp. 1-13.

International Search Report and Written Opinion dated Jul. 7, 2021, issued in application No. PCT/CN2020/120000.

Lenovo, et al.; "Discussion on Latency Reduction for V2X Phase 2;" 3GPP TSG RAN WG1 Meeting #92bis R1-1804206; Apr. 2018; pp. 1-3.

International Search Report and Written Opinion dated Dec. 30, 2021, issued in application No. PCT/CN2021/121167.

Fraunhofer HHI, et al.; "Resource Allocation Enhancements for Mode 2;" 3GPP TSG RAN WG1 Meeting #102-e; Aug. 2020; pp. 1-8.

Huawei, et al.; "Inter-UE coordination in sidelink resource allocation;" 3GPP TSG RAN WG1 Meeting #102-e; Aug. 2020; pp. 1-9.

LG Electronics; "Discussion on feasibility and benefits for mode 2 enhancement;" 3GPP TSG RAN WG1 Meeting #102-e; Aug. 2020; pp. 1-9.

Moderator (LG Electronics); "Summary for AI 8.11.2.2 Feasibility and benefits for mode 2 enhancements;" #3GPP TSG RAN WG1 #102-e; Aug. 2020; pp. 1-33.

SONY; "Physical layer procedures for NR sidelink;" 3GPP TSG RAN WG1 #99; Nov. 2019; pp. 1-5.

* cited by examiner

USER EQUIPMENT AND METHOD FOR ALLOCATING SIDELINK RESOURCES

CROSS REFERENCE TO RELATED APPLICATIONS

This application claims priority of Patent Cooperation Treaty (PCT) Patent Application No. PCT/CN2020/120000, filed on Oct. 9, 2020, the entirety of which is incorporated by reference herein.

FIELD OF THE INVENTION

The invention generally relates to wireless communication technology, and more particularly, to a sidelink (SL) resource allocation technology.

BACKGROUND OF THE INVENTION

GSM/GPRS/EDGE technology is also called 2G cellular technology, WCDMA/CDMA-2000/TD-SCDMA technology is also called 3G cellular technology, and LTE/LTE-A/TD-LTE technology is also called 4G cellular technology. These cellular technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In the 5G NR, the Sidelink (SL) Vehicle-to-Everything (V2X) communication has the potential to modernize mobile communications for vehicles and significantly reduce the number of vehicular crashes and fatalities. Furthermore, SL V2X technologies can improve traffic management and the safety of autonomous vehicles. SL V2X technologies enable communications between vehicles as well as communications between a vehicle and other communication entities. In the SL V2X technologies, there are two kinds of mechanisms for allocating SL resources, i.e. Mode 1 (the SL resources are allocated by the network node) and Mode 2 (the SL resources are allocated by the UE itself). However, in Mode 2, an SL resources conflict may occur when communication between a peer-transmitting UE (peer-Tx UE) and a peer-receiving UE (peer-Rx UE) experiences interference from other Tx UEs.

SUMMARY OF THE INVENTION

A method and a user equipment (UE) for allocating sidelink resources are provided to overcome the problems mentioned above.

An embodiment of the invention provides a method for allocating sidelink resource. The method is applied to a first UE in a sidelink communication to transmit signal to a second UE which is a peer receiving (peer-Rx) UE of the first UE. The method comprises the steps of maintaining, a counter to record how many remaining periodic reservations of sidelink resource to be used for sidelink signal transmission, wherein the periodic reservations are associated with a reservation period; receiving, in the sidelink communication, assistance information from the second UE or from a third UE which is not the peer-Rx UE of the first UE; and determining, whether to reselect a new sidelink resource different from the sidelink resource comprising the remaining periodic reservations according to the receiving assistance information even if the counter is greater than 0, to transmit signal to the second UE.

In some embodiments of the invention, the method may further comprise the step of before reselecting the new sidelink resource according to the assistance information, transmitting a sidelink control information (SCI) at least of one of the remaining periodic reservations to indicate the periodic reservations had been made are no longer held. In the embodiments, a reservation period in the SCI is set to 0.

In some embodiments of the invention, the method may further comprise the step of transmitting a SCI at a sidelink resource at one of the periodic reservations of sidelink resource; wherein a first part of the SCI which the first UE transmits to the second UE carries an information to indicate whether the SCI is from the first UE and/or the SCI is intended to the second UE. In an embodiment, the information may comprise an ID of the first UE or an ID of the second UE. In another embodiment, the information comprises a number of bits representing part of an ID of the first UE or an ID of the second UE.

An embodiment of the invention provides a user equipment (UE) for allocating sidelink resource. The UE is applied to be a transmitting UE (Tx UE) in a sidelink communication. The UE may comprise a radio frequency (RF) signal processing device and a processor. The RF signal processing device receives assistance information from a second UE which is a peer-Rx UE of the first UE or a third UE which is not the peer-Rx UE of the first UE in the sidelink communication. The processor is coupled to the RF signal processing device. The processor the processor maintains a counter to record how many remaining periodic reservations of sidelink resource to be used for sidelink signal transmission, wherein the periodic reservations are associated with a reservation period, and determines whether to reselect a new sidelink resource, which is different from the sidelink resource comprising the periodic reservations, according to the assistance information even if the counter is greater than 0.

Other aspects and features of the invention will become apparent to those with ordinary skill in the art upon review of the following descriptions of specific embodiments of the UE and the method for allocating sidelink resources.

BRIEF DESCRIPTION OF THE DRAWINGS

The invention will become more fully understood by referring to the following detailed description with reference to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
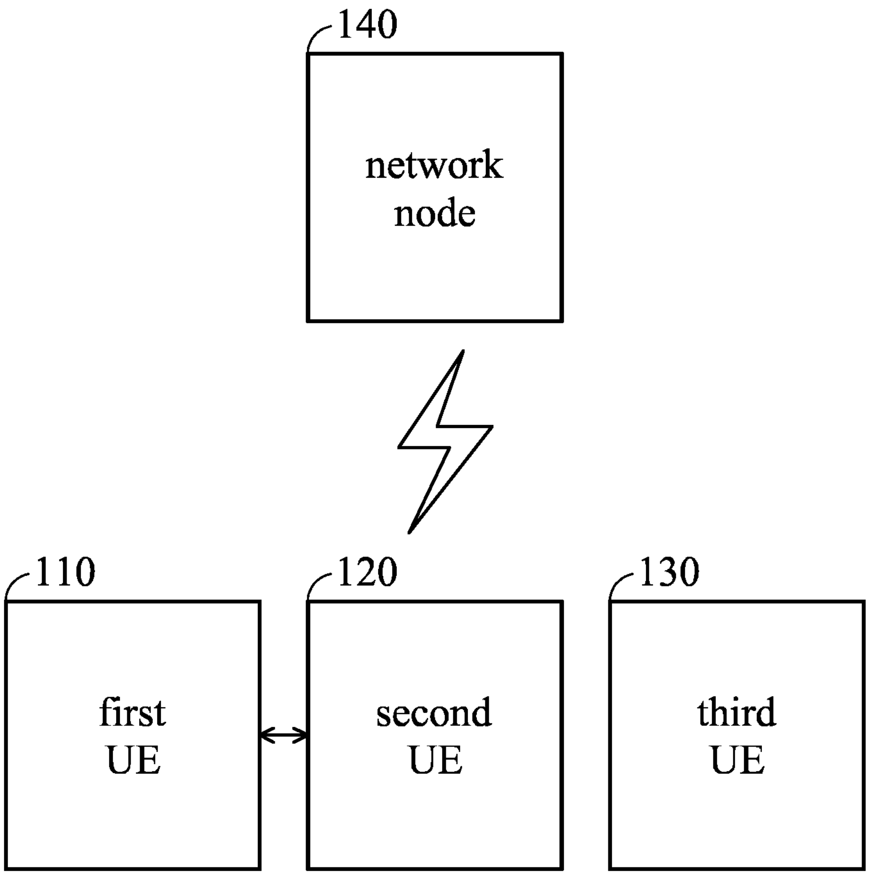
FIG. 1 is a block diagram of a sidelink (SL) communications system 100 according to an embodiment of the invention.

FIG. 1 is a block diagram of a sidelink (SL) communications system 100 according to an embodiment of the invention. As shown in FIG. 1, the sidelink communications system 100 may comprise a first user equipment (UE) 110, a second UE 120, a third UE 130 and a network node 140. It should be noted that in order to clarify the concept of the invention, FIG. 1 presents a simplified block diagram in which only the elements relevant to the invention are shown. However, the invention should not be limited to what is shown in FIG. 1.

In the embodiments of the invention, the first UE 110 may be regarded as a peer-transmitting UE (peer-Tx UE) and the second UE 120 may be regarded as a peer-receiving UE (peer-Rx UE), but the invention should not be limited thereto. In addition, in the embodiments of the invention, the third UE 130 may be a Tx UE or a Rx UE. The UE 110, the second UE 120 and the third UE 130 may communicate with each other through the sidelink technology.

In the embodiments of the invention, the network node 140 may be a base station, a gNodeB (gNB), a NodeB (NB) an eNodeB (eNB), an access point, an access terminal, but the invention should not be limited thereto. In the embodiments, the UE 110, the second UE 120, and/or the third UE 130 may communicate with the network node 140 through the fifth generation (5G) communication technology or 5G New Radio (NR) communication technology, but the invention should not be limited thereto.

Figure 2:
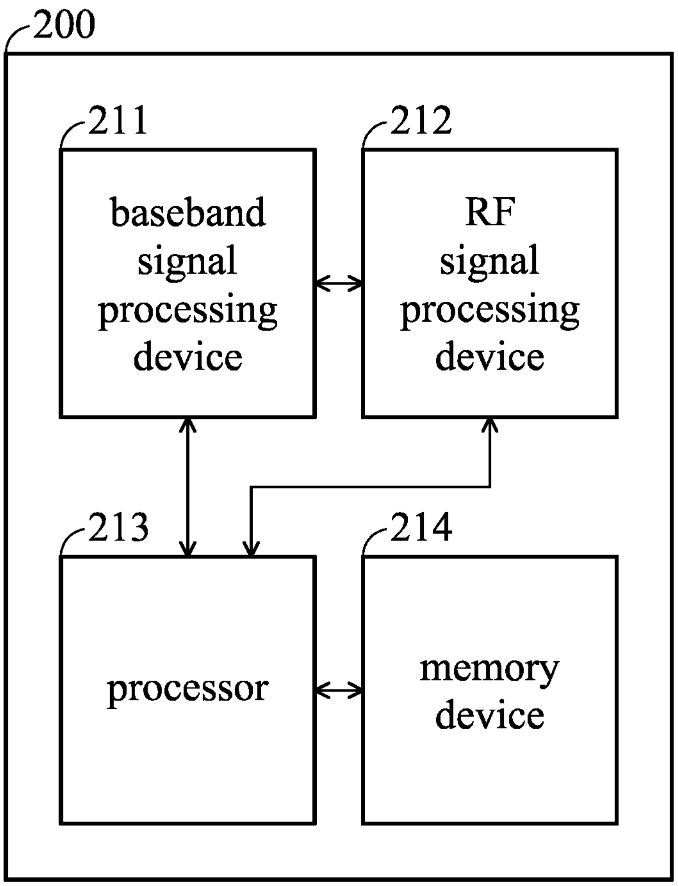
FIG. 2 is a block diagram of a UE 200 according to an embodiment of the invention.

FIG. 2 is a block diagram of a UE 200 according to an embodiment of the invention. As shown in FIG. 2, the UE 200 may comprise at least a baseband signal processing device 211, a radio frequency (RF) signal processing device 212, a processor 213, a memory device 214 and an antenna module comprising at least one antenna. The UE 200 can be applied to the UEs 110~130. It should be noted that in order to clarify the concept of the invention, the UE 200 of FIG. 2 presents a simplified block diagram in which only the elements relevant to the invention are shown. However, the invention should not be limited to what is shown in FIG. 2.

In the embodiments of the invention, the UE 200 may be a car, a smartphone, a laptop computer, or a wireless handset, but the invention should not be limited thereto.

The RF signal processing device 212 may receive RF signals via the antenna and process the received RF signals to convert the received RF signals to baseband signals to be processed by the baseband signal processing device 211, or receive baseband signals from the baseband signal processing device 211 and convert the received baseband signals to RF signals to be transmitted to a peer communications apparatus. The RF signal processing device 212 may comprise a plurality of hardware elements to perform radio frequency conversion. For example, the RF signal processing device 212 may comprise a power amplifier, a mixer, analog-to-digital converter (ADC)/digital-to-analog converter (DAC), etc.

The baseband signal processing device 211 may further process the baseband signals to obtain information or data transmitted by the peer communications apparatus. The baseband signal processing device 211 may also comprise a plurality of hardware elements to perform baseband signal processing.

The processor 213 may control the operations of the baseband signal processing device 211 and the RF signal processing device 212. According to an embodiment of the invention, the processor 213 may also be arranged to execute the program codes of the software modules of the corresponding baseband signal processing device 211 and/or the RF signal processing device 212. The program codes accompanied by specific data in a data structure may also be referred to as a processor logic unit or a stack instance when being executed. Therefore, the processor 213 may be regarded as being comprised of a plurality of processor logic units, each for executing one or more specific functions or tasks of the corresponding software modules.

The memory device 214 may store the software and firmware program codes, system data, user data, etc. of the UE 110. The memory device 214 may be a volatile memory such as a Random Access Memory (RAM); a non-volatile memory such as a flash memory or Read-Only Memory (ROM); a hard disk; or a combination thereof.

According to an embodiment of the invention, the RF signal processing device 212 and the baseband signal processing device 211 may collectively be regarded as a radio module capable of communicating with a wireless network to provide wireless communications services in compliance with a predetermined Radio Access Technology (RAT). Note that, in some embodiments of the invention, the UE 200 may be extended further to comprise more than one antenna and/or more than one radio module, and the invention should not be limited to what is shown in FIG. 2.

In an embodiment of the invention, when a sidelink communication is established between a peer-Tx UE (i.e. the first UE 110) and a peer-Rx UE (i.e. the second UE 120), the peer-Tx UE (i.e. the first UE 110) may transmit a sidelink control information (SCI) to the peer-Rx UE (i.e. the second UE 120) through the sidelink resource. Each SCI may comprise a first part and a second part. In NR, the first part of SCI is called $1^{st}$-stage SCI and the second part of SCI is called $2^{nd}$-stage SCI. The $1^{st}$-stage SCI is potentially decodable by all UEs. When the second UE 120 receives the SCI from the first UE 110 in a time slot, the second UE 120 may decode the SCI from the first UE 110. It should be noted that in order to illustrate the embodiments of the invention, the SCI from the first UE 110 successfully decoded by the second UE 120 is regarded as a first SCI and the following one or more second SCIs transmitted by the first UE 110 are regarded as second SCIs. When the second UE 120 successfully decodes the first SCI from the first UE 110, the second UE 120 may obtain resource allocation information. The resource allocation information may indicates one or more time slots allocated for following one or more second SCIs to be transmitted by the first UE 110. In addition, the resource allocation information may indicates a periodic reservation interval for periodic reservations of the following one or more second SCIs in multiple periodic slots. The periodic reservation interval may be a time gap between the first SCI which is successfully decoded and the next second SCI from the peer-Tx UE (i.e. the first UE 110) or a time gap between two successive second SCIs from the peer-Tx UE (i.e. the first UE 110). For example, if the periodic reservation interval obtained from the resource allocation information in slot #n is P slot time (e.g. 100 milliseconds), the second UE 120 may know that the next second SCI from the first UE 110 will be received at slot #(n+P). In an embodiment of the invention, the periodic reservation interval may be carried in the first part of the SCI. It should be noted that besides the periodic reservation interval, the decoded SCI may comprise other information. It should be noted that the following operations in the embodiments of the invention will be under the condition of the second UE 120 has been successfully decode at least one SCI from the peer-Tx UE (i.e. first UE 110).

According to an embodiment of the invention, if the second UE 120 has successfully decoded a SCI from the first UE 110 (i.e. the first SCI), when the second UE 120 receives a new SCI in the one or more time slots allocated for the one or more second SCIs to be transmitted by the peer-Tx UE, wherein the new SCI may be the second SCI sent by the peer-Tx UE or another SCI sent by other UEs, the second UE 120 may determine whether to transmit assistance information to the first UE 110 or other UEs (e.g. the third UE 130) when a trigger condition is met. The trigger condition may be associated with the decoding results of the SCIs received by the second UE 120 (peer-Rx UE). Details for the trigger condition are discussed below.

According to an embodiment of the invention, if the second UE 120 has been successfully decode one SCI (i.e. the first SCI) from the first UE 110 in a time slot, when the second UE 120 receives a new SCI in next periodic time slot (i.e. after a periodic reservation interval), the second UE 120 may determine whether the new SCI can be decoded successfully (i.e. determine whether the first part of the SCI and the second part of the SCI can be decoded successfully) first.

In an embodiment of the invention, the trigger condition may comprise that if the second UE 120 has successfully decoded one SCI (i.e. the first SCI) from the first UE 110 in a time slot, the new SCI cannot be successfully decoded in the next periodic time slot. Specifically, when the new SCI cannot be decoded successfully in the next periodic time slot (i.e. the trigger condition is met), it means that a resource conflict (or resource collision) may occur (i.e. the new SCI may experience interference from other signal sent from other UEs (e.g. the third UE 130)). Therefore, the second UE 120 may transmit the assistance information to the first UE 110 to tell first UE 110 that the new SCI cannot be decoded successfully at the periodic slot and suggest the first UE 110 to reselect a sidelink resource to transmit the following new SCI. For example, if the periodic reservation interval obtained from the resource allocation information in slot #n is P slots, when the new SCI cannot be decoded successfully at slot #(n+P) (i.e. the trigger condition is met), the second UE 120 may transmit the assistance information to the first UE 110.

In another embodiment of the invention, the trigger condition may further comprise that if the second UE 120 has been successfully decode one SCI (i.e. the first SCI) from the first UE 110 in a time slot, the new SCIs cannot be successfully decoded in the following N successive periodic time slots, wherein N is a positive integer greater than 1. Specifically, when the new SCIs cannot be decoded successfully in following N successive periodic time slots (i.e. the trigger condition is met), it means that a resource conflict (or resource collision) may occur (i.e. the new SCIs may experience interference from other information from other UEs (e.g. the third UE 130)). Therefore, the second UE 120 may transmit the assistance information to tell the first UE 110 that the new SCIs cannot be decoded successfully in the following N successive periodic time slots and suggest the first UE 110 to reselect a sidelink resource to transmit the following new SCIs. For example, if the periodic reservation interval obtained from the resource allocation information in slot #n is P slot time, when the new SCIs cannot be decoded successfully in slot #(n+mP), for m=1, 2, . . . , N, where N is a predefined integer greater than 1, the second UE 120 may transmit the assistance information to the first UE 110. That is to say, in the embodiment, the second UE 120 may detect or observe at least two periodic slots when the new SCI cannot be decoded successfully.

In an embodiment of the invention, the new SCI cannot be decoded successfully may mean that the first part of the new SCI is not decodable but the measured Reference Signal Receiving Power (RSRP) and/or Received Signal Strength Indication (RSSI) at the sidelink resource expected to receive the new SCI from the first UE 110 is greater than a threshold (i.e. the second UE 120 may receive the SCI from other Tx UEs (e.g. the third UE 130)). In another embodiment, if the new SCI cannot be decoded successfully, it may mean that the first part of the new SCI is decodable but the second part of the new SCI is not decodable (i.e. failure of the PSCCH decoding may occur).

According to an embodiment of the invention, when the new SCI can be decoded successfully, the trigger condition may further comprise that the new SCI does not belong to the first UE 110 (i.e. the new SCI is not the second SCI). Specifically, when the new SCI can be decoded successfully, the second UE 120 may further determine whether the successfully decoded new SCI belongs to the first UE 110 (i.e. determine whether the new SCI is from the peer-Tx UE (i.e. the new SCI is not the second SCI) or determine whether the new SCI is intended for the peer-Rx UE).

When the successfully decoded new SCI belongs to the first UE 110 (i.e. the trigger condition is not met), the second UE 120 may determine that there has been no resource conflict (or resource collision) in the sidelink communication with the first UE 110.

When the successfully decoded new SCI belongs to other Tx UEs (e.g. the third UE 130) (i.e. the trigger condition is met), the second UE 120 may determine that a resource conflict (or a resource collision) has occurred in the sidelink communication with the first UE 110. Therefore, the second UE 120 may transmit the assistance information to the first UE 110 and/or the third UE 130 to suggest the first UE 110 and/or the third UE 130 to reselect a sidelink resource to transmit the SCI to avoid the resource conflict (or resource collision).

According to an embodiment of the invention, the first part of a SCI transmitted from a Tx UE to its peer-Rx UE may carry information to indicate whether or not the SCI is from a peer-Tx UE (e.g. the first UE 110) and/or whether or not the SCI is intended for a peer-Rx UE (e.g. the second UE 120). In NR, the first part of a SCI is potentially decodable for all sidelink UEs. In the embodiment, a source ID of a Tx UE or a destination ID of a Rx UE may be carried in first part of the SCI to indicate whether or not the SCI is from a peer-Tx UE (e.g. the first UE 110) and/or whether or not the SCI is intended for a peer-Rx UE (e.g. the second UE 120). In an embodiment, the ID-related information (e.g. the source ID or the destination ID) may be implemented by introducing a new field in SCI format with X bits (e.g. X=3, but the invention should not be limited thereto). The X bits may be part of the bits of the source ID or the destination ID. For example, when the second UE 120 checks the X bits in the first part of the new SCI and finds the ID-related information does not match the ID it expects, the second UE 120 may determine that whether the new SCI is from its peer-TX UE (i.e. the first UE 110) or whether the new SCI is intended for the second UE 120 (i.e. the new SCI is expected to be decoded by the second UE 120).

According to the embodiments of the invention, the second UE 120 may transmit the assistance information to the first UE 110 through a broadcast, unicast or groupcast channel. For example, the second UE 120 may transmit the assistance information to the first UE 110 through unicast or the second UE 120 may transmit the assistance information to all potential Tx UEs (e.g. the first UE 110 and the third UE 130) through broadcast, but the invention should not be limited thereto.

In addition, according to the embodiments of the invention, the assistance information transmitted to the Tx UE (e.g. the first UE 110 and/or the third UE 130) may be carried in the first part of the SCI transmitted to the Tx UE (the first part of SCI is called "$1^{st}$-stage SCI" in NR), the second part of the SCI transmitted to the Tx UE (the second part of SCI is called "$2^{nd}$-stage SCI" in NR), a physical sidelink feedback shared channel (PSFCH) or a data channel (e.g. physical sidelink shared channel (PSSCH)), but the invention should not be limited thereto. In an embodiment, the peer-Rx UE (e.g. the second UE 120) may send the SCI carrying the assistance information to the Tx UE (e.g. the first UE 110 and/or the third UE 130) with or without PSSCH. In another embodiment, when the assistance information is carried in the PSSCH, it means that the SCI is transmitted to the Tx UE with the PSSCH and the SCI may indicate that the PSSCH also carries the assistance information. For example, a field of the first part or the second part of the SCI may indicate whether the assistance information is carried in the PSSCH, but the invention should not be limited thereto.

According to another embodiment of the invention, when the successfully decoded new SCI belongs to other Tx UEs (e.g. the third UE 130), the trigger condition may further comprise that the first priority associated with the SCI which was from the first UE 110 and successfully decoded for the first time is not higher than the second priority associated with the successfully decoded new SCI belonging to other Tx UEs. Specifically, when the new SCI belongs to other Tx UEs (e.g. the third UE 130), the second UE 120 may further determine whether the first priority of first priority associated with the SCI which was from the first UE 110 and successfully decoded for the first time is higher than the second priority associated with the successfully decoded new SCI belonging to other Tx UEs (i.e. the third UE 130). The priority of each SCI may be predefined.

If the first priority is higher than the second priority of (i.e. the trigger condition is not met), the second UE 120 may transmit the assistance information to the third UE 130 to suggest the third UE 130 to reselect a sidelink resource to avoid the resource conflict (or resource collision) which interferes the sidelink communication between the first UE 110 and the second UE 120. In the embodiment, the second UE 120 may transmit the assistance information to the third UE 130 through broadcast or unicast. In addition, in the embodiment, the assistance information may be carried in the first part of the SCI, the second part of SCI or PSSCH. Furthermore, in the embodiment, the assistance information may further carry the partial or full ID of the first UE 110 in a field. When the first UE 110 receives the assistance information through broadcast, the first UE 110 can check the field (carried in SCI, MAC-CE, and/or PSSCH, but the invention should not be limited thereto) to know that this broadcast assistance information is targeting the other Tx UEs (i.e. the third UE 130) so that the first UE may ignore such assistance information to avoid any reselection by mistake.

If the first priority is not higher than the second priority (i.e. the trigger condition is met), the second UE 120 may transmit the assistance information to the first UE 110 to suggest the first UE 110 to reselect a sidelink resource to avoid the resource conflict (or resource collision). In the embodiment, the assistance information may be carried in the PSFCH.

According to an embodiment of the invention, a Tx UE may maintain a counter to record how many remaining periodic reservations of sidelink resource to be used for sidelink signal transmission, wherein the periodic reservations are associated with a reservation period (i.e. the periodic reservation interval). In the embodiment, when the Tx UE (e.g. the first UE 110 or the third UE 130) receives the assistance information from its peer-Rx UE or another UE which is not the peer-Rx UE of the Tx UE, the Tx UE may reselect a new sidelink resource different from the sidelink resource comprising the remaining periodic reservations immediately even if the counter is greater than 0. In the embodiment, the Tx UE may further determine whether to reselect a new sidelink resource based on the assistance information. If the Tx UE successfully receives assistance information and the assistance information suggests for resource reselection, the Tx UE may determine to reselect resource immediately. In other words, if the assistance information does not suggest for resource selection, the Tx UE may not perform the reselection. In the embodiment, the Tx UE may transmit a new SCI (i.e. the next SCI) which may indicate the reselected new sidelink resource to its peer-Rx UE.

According to an embodiment of the invention, the Tx UE may maintain a counter to record how many remaining periodic reservations of sidelink resource to be used for sidelink signal transmission, wherein the periodic reservations are associated with a reservation period (i.e. the periodic reservation interval). In the embodiment, when the Tx UE (e.g. the first UE 110 or the third UE 130) receives the assistance information from its peer-Rx UE or another UE which is not the peer-Rx UE of the Tx UE, in order to avoid reselecting the problematic sidelink resources (i.e. avoid overbooking issue), before reselecting a new sidelink resource according to the assistance information, the Tx UE may still transmits a SCI at least one of the remaining periodic reservations to indicate the periodic reservations had been made are no longer held. Then, the Tx UE may reselect a new sidelink resource different from the sidelink resource comprising the remaining periodic reservations according to the assistance information. In the embodiment, the Tx UE may further determine whether to reselect a new sidelink resource based on the assistance information. If the Tx UE successfully receives assistance information and the assistance information suggests for resource reselection, the Tx UE may determine to reselect resource immediately. In other words, if the assistance information does not suggest for resource selection, the Tx UE may not perform the reselection. In the embodiment, the reservation period indicated in the SCI at least one of the remaining periodic reservations may be set to 0 to indicate that the last PSSCH/PSCCH is occupying the reserved resource. In addition, in the embodiment, the Tx UE may transmit a new SCI which may indicate the reselected new sidelink resource and a new reservation period to its peer-Rx UE after the Tx UE reselects the sidelink resource.

Figure 3:
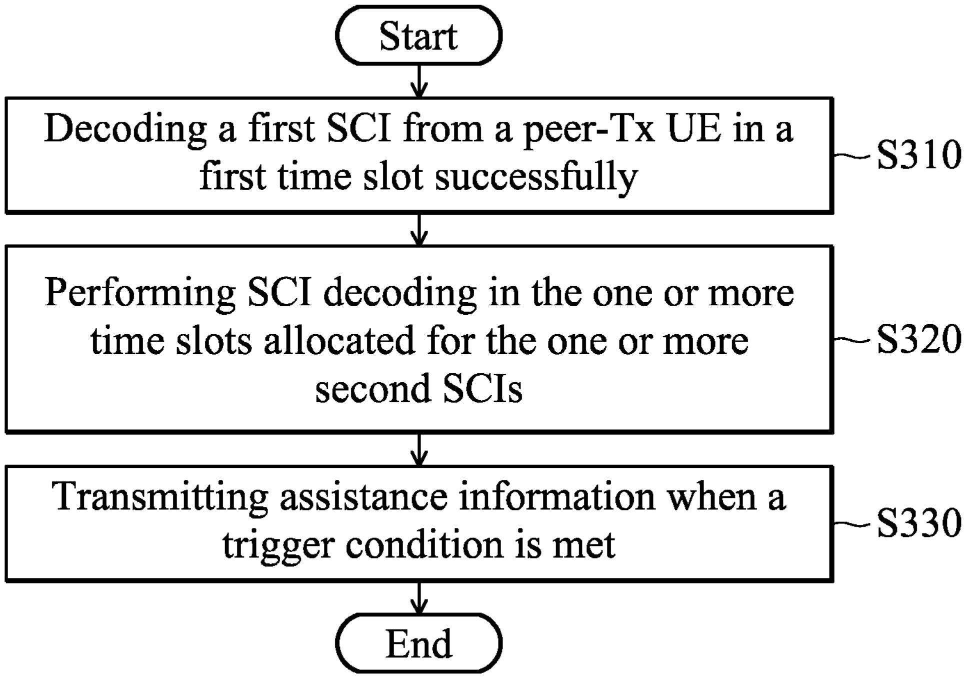
FIG. 3 is a flow chart illustrating a method for sidelink communication according to an embodiment of the invention.

FIG. 3 is a flow chart illustrating a method for sidelink communication according to an embodiment of the invention. The method for sidelink communication can be applied to a peer-Rx UE (e.g. the second UE 120) in the sidelink communication system 100. As shown in FIG. 3, in step S310, a processor of the peer-Rx UE may decode a first SCI from a peer-Tx UE in a first time slot successfully. The first SCI provides resource allocation information that indicates one or more time slots allocated for one or more second SCIs to be transmitted by the peer-Tx UE.

In step S320, the processor of the peer-Rx UE may perform SCI decoding in the one or more time slots allocated for the one or more second SCIs.

In step S330, a RF signal processing device of the peer-Rx UE may transmit assistance information when a trigger condition is met. The trigger condition is based on the performing SCI decoding in the one or more time slots allocated for the one or more second SCIs.

In an embodiment of the invention, in the method for sidelink communication, the trigger condition may comprise that if the peer-Rx UE has successfully decoded the first SCI from the peer-Tx UE in the first time slot, a SCI cannot be successfully decoded in the next periodic time slot. In another embodiment, in the method for sidelink communication, the trigger condition may comprise that if the peer-Rx UE has successfully decoded the first SCI from the peer-Tx UE in the first time slot, a plurality of SCIs cannot be successfully decoded in the following N successive periodic time slots, wherein N is a positive integer greater than 1.

In another embodiment of the invention, in the method for sidelink communication, the trigger condition may further comprise that when the SCI can be decoded successfully, the trigger condition may further comprise that the successfully decoded SCI does not belong to the peer-Tx UE.

In another embodiment of the invention, in the method for sidelink communication, the trigger condition may further comprise that when the successfully decoded SCI belongs to other Tx UEs, the trigger condition may further comprise that the first priority associated with the first SCI is not higher than the second priority associated with the successfully decoded SCI.

Figure 4:
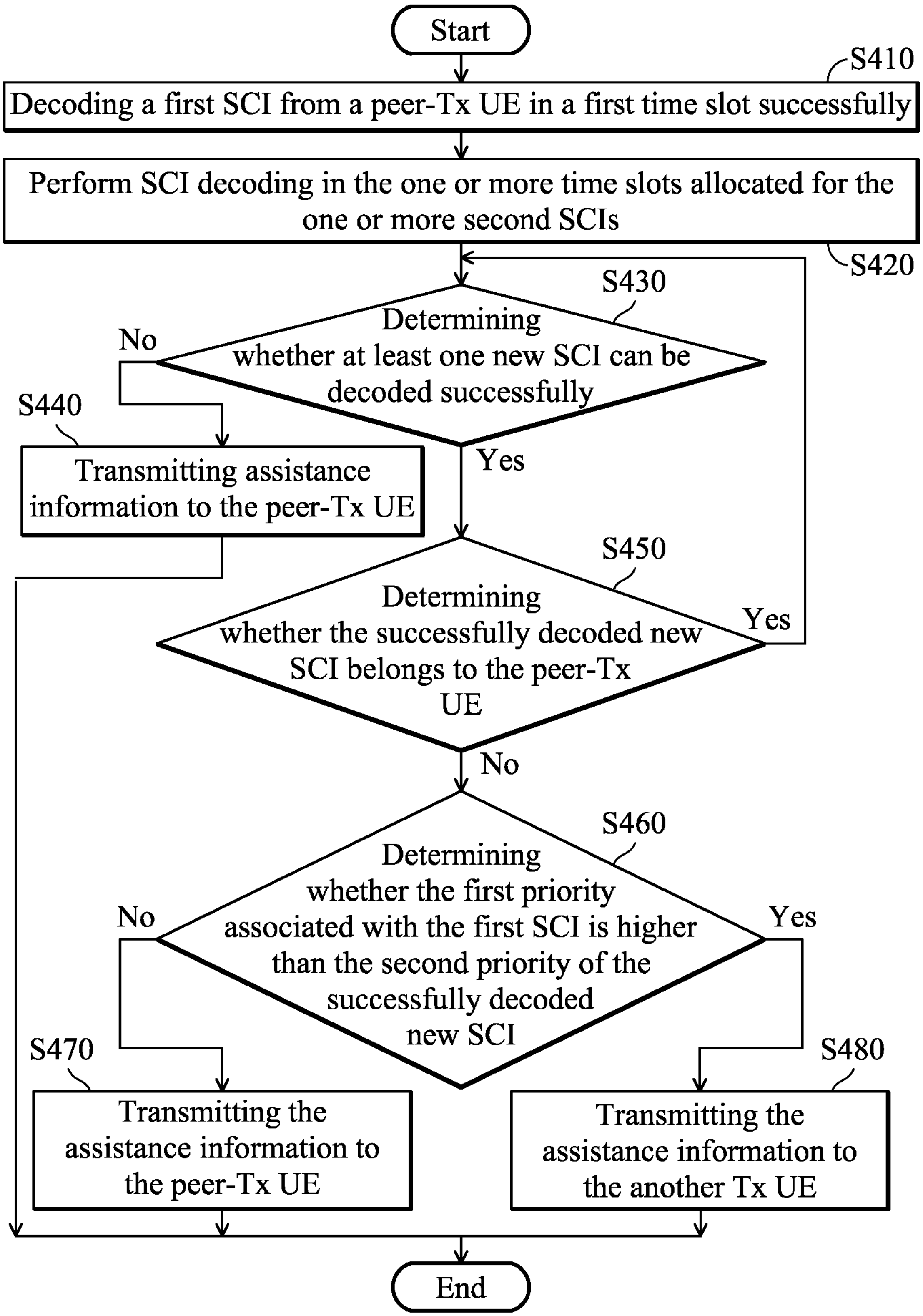
FIG. 4 is a flow chart illustrating a method for sidelink communication according to another embodiment of the invention.

FIG. 4 is a flow chart illustrating a method for sidelink communication according to another embodiment of the invention. The method for sidelink communication can be applied to a peer-Rx UE (e.g. the second UE 120) in the sidelink communication system 100. As shown in FIG. 4, in step S410, a processor of the peer-Rx UE may decode a first SCI from a peer-Tx UE in a first time slot successfully. The first SCI provides resource allocation information that indicates one or more time slots allocated for one or more second SCIs to be transmitted by the peer-Tx UE.

In step S420, the processor of the peer-Rx UE may perform SCI decoding in the one or more time slots allocated for the one or more second SCIs.

In step S430, the processor of the peer-Rx UE may determine whether at least one new SCI cannot be decoded successfully.

When the new SCI cannot be decoded successfully, step S440 is performed. In step S440, a RF signal processing device of the peer-Rx UE may transmit assistance information to the peer-Tx UE to suggest the peer-Tx UE to reselect a sidelink resource.

When the new SCI can be decoded successfully, step S450 is performed. In step S450, the processor of the peer-Rx UE may determine whether the successfully decoded new SCI belongs to the peer-Tx UE.

When the successfully decoded new SCI belongs to the peer-Tx UE, the method backs to step S430. When the successfully decoded new SCI belongs to another Tx UE, step S460 is performed. In step S460, the processor of the peer-Rx UE may determine whether the first priority associated with the first SCI is higher than the second priority of the successfully decoded new SCI.

When the first priority is not higher than the second priority, step S470 is performed. In step S470, the RF signal processing device of the peer-Rx UE may transmit assistance information to the assistance information to the peer-Tx UE to suggest the peer-Tx UE to reselect a sidelink resource.

When the first priority is higher than the second priority, step S480 is performed. In step S480, the RF signal processing device of the peer-Rx UE may transmit assistance information to the assistance information to the another Tx UE to suggest the another Tx UE to reselect a sidelink resource.

According to the embodiments of the invention, in the methods of FIG. 3 and FIG. 4, the peer-Rx UE may transmit the assistance information to the peer-Tx UE through a broadcast, unicast or groupcast channel.

According to the embodiments of the invention, in the methods of FIG. 3 and FIG. 4, the assistance information is transmitted to the peer-Tx UE through the first part of a SCI transmitted to the peer-Tx UE, the second part of a SCI transmitted to the peer-Tx UE, a physical sidelink feedback shared channel (PSFCH), or a data channel.

Figure 5:
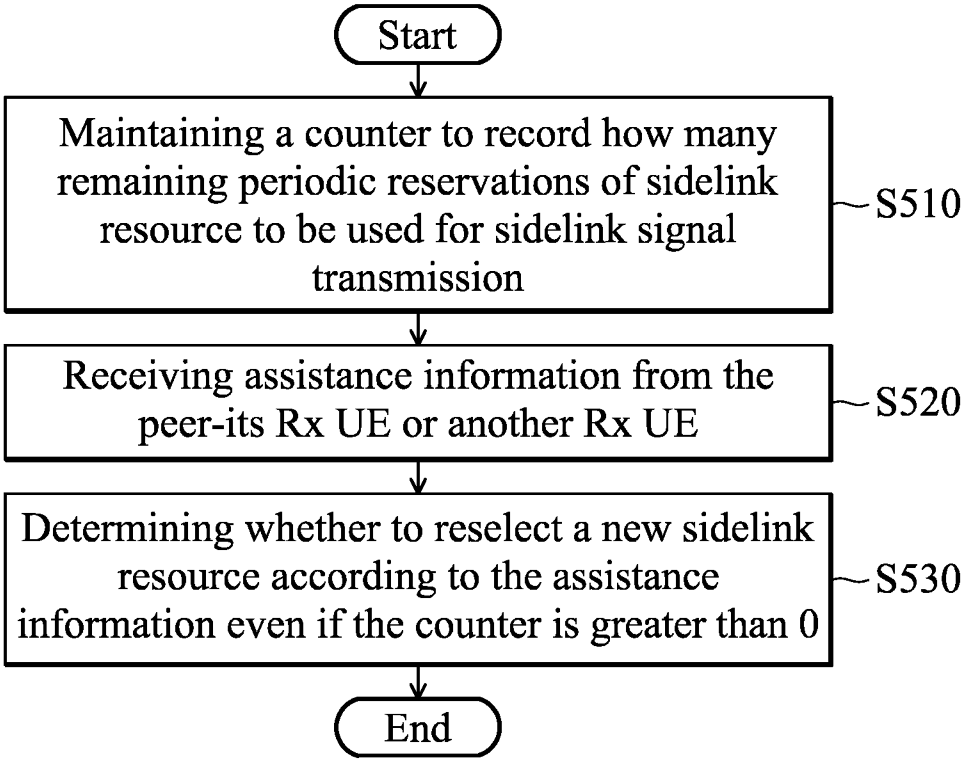
FIG. 5 is a flow chart illustrating a method for allocating sidelink resources according to another embodiment of the invention.

FIG. 5 is a flow chart illustrating a method for allocating sidelink resources according to another embodiment of the invention. The method for allocating sidelink resources can be applied to a Tx UE (e.g. the second UE 120 or. the second UE 130) in the sidelink communication system 100. As shown in FIG. 5, in step S510, a processor of the Tx UE may maintain a counter to record how many remaining periodic reservations of sidelink resource to be used for sidelink signal transmission, wherein the periodic reservations are associated with a reservation period.

In step S520, the RF signal processing device of the Tx UE may receive assistance information from its peer-Rx UE or another UE which is not the peer-Rx UE of the Tx UE.

In step S530, the processor of the Tx UE may determine whether to reselect a new sidelink resource according to the assistance information even if the counter is greater than 0. If the Tx UE successfully receives assistance information and the assistance information suggests for resource reselection, the Tx UE may determine to reselect resource immediately. In other words, if the assistance information does not suggest for resource selection, the Tx UE may not perform the reselection.

Figure 6:
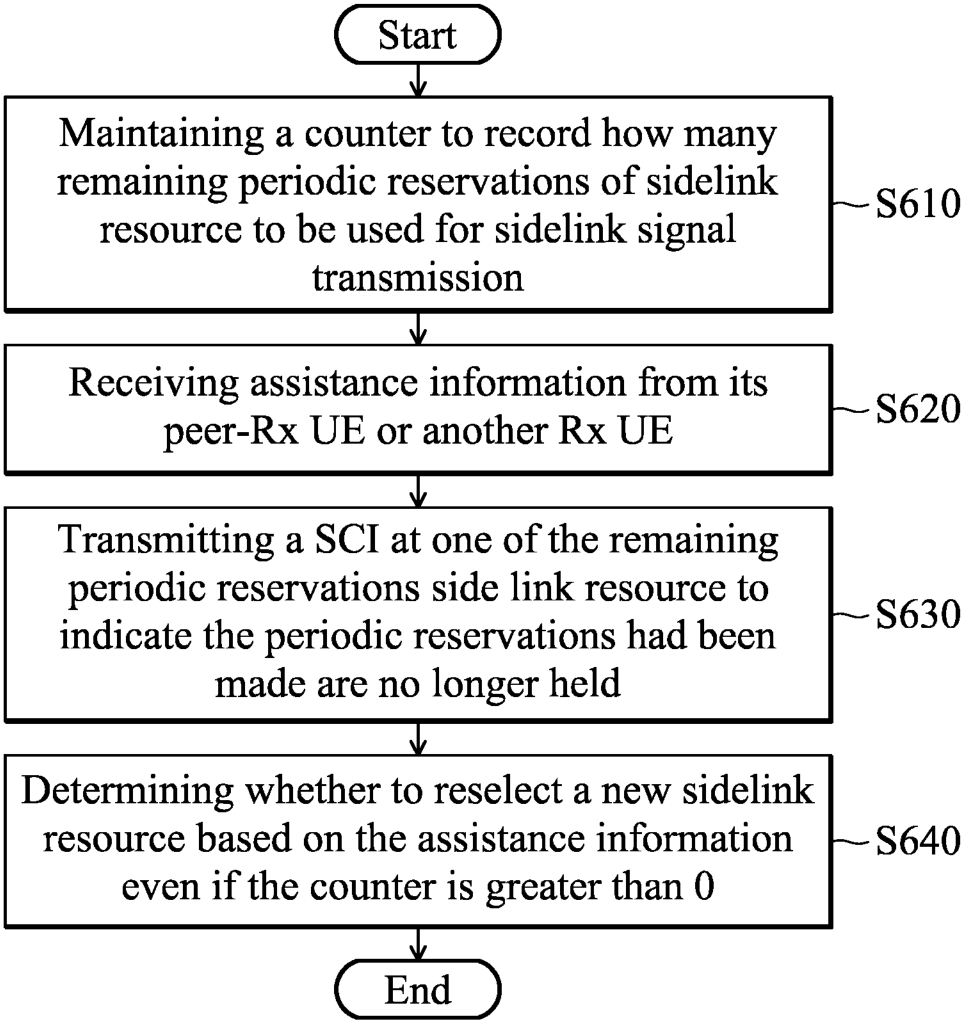
FIG. 6 is a flow chart illustrating a method for allocating sidelink resources according to another embodiment of the invention.

FIG. 6 is a flow chart illustrating a method for allocating sidelink resources according to another embodiment of the invention. The method for allocating sidelink resources can be applied to a Tx UE (e.g. the second UE 120 or the second UE 130) in the sidelink communication system 100. As shown in FIG. 6, in step S610, a processor of the Tx UE may maintain a counter to record how many remaining periodic reservations of sidelink resource to be used for sidelink signal transmission, wherein the periodic reservations are associated with a reservation period.

In step S620, the RF signal processing device of the Tx UE may receive assistance information from its peer-Rx UE or another UE which is not the peer-Rx UE of the Tx UE.

In step S630, the RF signal processing device of the Tx UE may transmits a SCI at one of the remaining periodic reservations side link resource to indicate the periodic reservations had been made are no longer held. In an embodiment, the reservation period carried (or indicated) in the SCI may be set to 0 to indicate that the last PSSCH/PSCCH is occupying the reserved resource. Furthermore, in the embodiment, when the Tx UE set the reservation period carried in the first part of the SCI to 0, the Tx UE may ignore the original counter for the reservation period, wherein the counter is used to determine the number of the reservation periods for transmitting SCIs to the peer-Rx UE.

In step S640, the processor of the Tx UE may determine whether to reselect a new sidelink resource based on the assistance information even if the counter is greater than 0. If the assistance information suggests for resource reselection, the Tx UE may determine to reselect resource immediately. In other words, if the assistance information does not suggest for resource selection or the Tx UE cannot successfully receive the assistance information, the Tx UE may not perform the reselection. In the embodiment, the Tx UE may transmit a new SCI which may indicate the reselected new sidelink resource and a new reservation period to its peer-Rx UE.

According to the embodiments of the invention, in the methods of FIG. 5 and FIG. 6, the first part of the SCI may carry information to indicate whether or not the SCI is from a peer-Tx UE (e.g. the first UE 110) and/or whether or not the SCI is intended for a peer-Rx UE (e.g. the second UE 120). In the embodiments, a source ID of the Tx UE or a destination ID of its Rx UE may be carried in first part of the SCI to indicate whether or not the SCI is from a peer-Tx UE (e.g. the first UE 110) and/or whether or not the SCI is intended for a peer-Rx UE (e.g. the second UE 120). Furthermore, in an embodiment of the invention, the information carried in the SCI may comprise a number of bits representing part of a source ID of the Tx UE or a destination ID of the peer-Rx UE.

In the method for allocating sidelink resources provided in the invention, in Mode 2 of the SL V2X technology, when a resource conflict (or resource collision) occurs in the sidelink communication, the allocation of the sidelink resources will be more flexible and efficient.

Use of ordinal terms such as “first”, “second”, “third”, etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a “processor”) such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

The invention claimed is:

1. A method for allocating sidelink resource, wherein the method is applied to a first UE in a sidelink communication to transmit signal to a second UE which is a peer receiving (peer-Rx) UE of the first UE, comprising:

maintaining, a counter to record how many remaining periodic reservations of sidelink resource to be used for sidelink signal transmission, wherein the periodic reservations are associated with a reservation period;

receiving, in the sidelink communication, assistance information from the second UE or from a third UE which is not the peer-Rx UE of the first UE; and determining, whether to reselect a new sidelink resource different from the sidelink resource comprising the remaining periodic reservations according to the receiving assistance information even if the counter is greater than 0, to transmit signal to the second UE, wherein the method further comprises:

transmitting, a sidelink control information (SCI) at a sidelink resource at one of the periodic reservations of sidelink resource; wherein a first part of the SCI which the first UE transmits to the second UE carries an information to indicate whether the SCI is from the first UE and/or the SCI is intended to the second UE wherein the assistance information from the second UE is autonomously transmitted by the second UE according to a trigger condition, wherein the trigger condition comprises that the second UE has successfully decoded one sidelink control information (SCI) indicating periodic reservations from the first UE in a time slot, and a new SCI cannot be successfully decoded in at least one of next periodic time slots.

2. The method of claim 1, further comprising:

before reselecting the new sidelink resource according to the assistance information, transmitting the SCI at least of one of the remaining periodic reservations to indicate the periodic reservations had been made are no longer held.

3. The method of claim 2, wherein a reservation period indicated in the SCI is set to 0.

4. The method of claim 1, wherein the information comprises an ID of the first UE or an ID of the second UE.

5. The method of claim 1, wherein the information comprises a number of bits representing part of an ID of the first UE or an ID of the second UE.

6. A UE for allocating sidelink resource and for sidelink signal transmission in a sidelink communication, applied to a Tx UE in a sidelink communication, comprising:

a radio frequency (RF) signal processing device, receiving assistance information from a second UE which is a peer-Rx UE of the first UE or a third UE which is not the peer-Rx UE of the first UE in the sidelink communication; and a processor, coupled to the RF signal processing device, wherein the processor maintains a counter to record how many remaining periodic reservations of sidelink resource to be used for sidelink signal transmission, wherein the periodic reservations are associated with a reservation period, and determines whether to reselect a new sidelink resource, which is different from the sidelink resource comprising the periodic reservations, according to the assistance information even if the counter is greater than 0, wherein the RF signal processing device transmits a sidelink control information (SCI) to the peer-Rx UE at one of the periodic reservations of sidelink resource, wherein a first part of the SCI carries information to indicate whether the SCI is not from the first UE and and/or whether the SCI is intended to the second UE wherein the assistance information from the second UE is autonomously transmitted by the second UE according to a trigger condition, wherein the trigger condition comprises that the second UE has successfully decoded one sidelink control information (SCI) indicating periodic reservations from the first UE in a time slot, and a new SCI cannot be successfully decoded in at least one of next periodic time slots.

7. The UE of claim 6, wherein before reselecting the new sidelink resource according to the assistance information, the RF signal processing device transmits the SCI at one of the remaining periodic reservations to indicate the periodic reservations had been made are no longer held.

8. The UE of claim 7, wherein a reservation period in the SCI is set to 0.

9. The UE of claim 6, wherein the information comprises an ID of the first UE or an ID of the second UE.

10. The UE of claim 6, wherein the information comprises a number of bits representing part of an ID of the first UE or part of an ID of the second UE.

* * * * *